United States Patent [19]

Hasebe et al.

[11] Patent Number: 4,972,078
[45] Date of Patent: Nov. 20, 1990

[54] PULSE GENERATING CIRCUIT FOR DETECTING APERTURE SIZE OF CAMERA SHUTTER

[75] Inventors: Shinichi Hasebe, Yokohama; Masayuki Sasaki, Sagamihara, both of Japan

[73] Assignee: Kabushiki Kaisha Toshiba, Kawasaki, Japan

[21] Appl. No.: 339,266

[22] Filed: Apr. 17, 1989

[30] Foreign Application Priority Data

Apr. 20, 1988 [JP] Japan .................................. 63-97146

[51] Int. Cl.$^5$ .......................... G01D 5/34; H01J 40/14; G03B 7/08
[52] U.S. Cl. ............................... 250/229; 250/231.14; 354/435; 354/230
[58] Field of Search ................ 250/229, 214 R, 214 A, 250/231.14; 354/435, 436, 437, 438, 439, 440, 448, 476, 230, 271.1; 307/311

[56] References Cited

U.S. PATENT DOCUMENTS

| | | | |
|---|---|---|---|
| 4,558,226 | 12/1985 | Takada et al. | 250/214 R |
| 4,591,708 | 5/1986 | Shu | 250/214 R |
| 4,708,454 | 11/1987 | Kodaira et al. | 354/435 |
| 4,751,543 | 6/1988 | Kodaira et al. | 354/435 |
| 4,762,992 | 8/1988 | Gat et al. | 250/214 R |
| 4,835,564 | 5/1989 | Nakagawa et al. | 354/435 |

Primary Examiner—David C. Nelms
Assistant Examiner—Michael Messinger
Attorney, Agent, or Firm—Finnegan, Henderson, Farabow, Garrett, and Dunner

[57] ABSTRACT

In at least one of a plurality of shutter vanes forming a shutter there are provided a plurality of openings adapted to detect the movement of the shutter vanes. A photointerrupter is turned on and off by the openings when the shutter vanes move. An output voltage of the photointerrupter is compared with a reference voltage by a comparator. A series combination of a switch, which is turned on and off by the output voltage of the comparator, and a resistor is connected between the output of the photointerrupter and ground. The output signal of the comparator is delayed. The delayed version and the output signal of the comparator are exclusive ORed to produce a train of pulses corresponding to the openings as the shutter vanes move. A drive and control section is responsive to the count of the pulses to control the operation of the shutter.

9 Claims, 4 Drawing Sheets

FIG. 3A $V_{PIP}$

FIG. 5A $V_{PIP}$

PULSE GENERATING CIRCUIT FOR DETECTING APERTURE SIZE OF CAMERA SHUTTER

BACKGROUND OF THE INVENTION

1. Field of the Invention

The present invention relates to a pulse generating circuit for generating pulses.

2. Description of the Related Art

In controlling the shutter of a camera, electrically detecting the size of an aperture of the shutter and controlling shutter operation on the basis of the detected aperture would be convenient. However, such a shutter control system is not generally known hitherto.

SUMMARY OF THE INVENTION

It is an object of the present invention to provide a pulse generating circuit suitable for controlling the shutter of a camera.

It is another object of the present invention to provide a pulse generating circuit which permits stable generation of pulses on the basis of the on and off of an input optical signal.

According to an aspect of the present invention there is provided a pulse generating circuit comprising: a shutter (10) formed of a plurality of shutter vanes which are movable to form an aperture, the aperture varying in size with the movement of said shutter vanes and at least one of said shutter vanes having a plurality of openings (10-5) for detecting the movement of said shutter vanes; a photointerrupter (20) responsive to the movement of said detecting openings of said shutter vanes to be turned on or off, said photointerrupter providing an output voltage at its output terminal when turned on; a voltage comparator (11) for comparing the output voltage of said photointerrupter with a reference voltage; reference voltage generating means (I, R3 ...) for generating the reference voltage; switch means (14) which is turned on or off by an output signal of said voltage comparator; a resistor (R2) connected in series with said switch means, the series combination of said switch means and said resistor being connected between the output terminal of said photointerrupter and a terminal of a predetermined potential (ground); delay circuit mean (17) for delaying the output signal of said voltage comparator a predetermined time; exclusive OR circuit means (18) for exclusive ORing an output signal of said delay circuit means and the output signal of said voltage comparator to produce a train of pulses corresponding to said openings during the movement of said shutter vanes; counter means for counting the pulses output from said exclusive OR circuit means; and control and drive means responsive to said counter means for controlling the operation of said shutter.

With such an arrangement as described above, the movement of the shutter vanes can accurately be detected and hence the size of the aperture of the shutter can be detected so as to accurately control the shutter.

According to another aspect of the present invention, there is provided a pulse generating circuit comprising: light receiving means (22) responsive to incident light for producing an output signal; comparator means (11) for comparing the output signal of said light receiving means with a reference signal; reference signal generating means (I, R3...) for generating the reference signal; delay circuit means (17) for delaying an output signal of said comparator means a predetermined time; and exclusive OR circuit means (18) for exclusive ORing an output signal of said delay circuit means and the output signal of said comparator means.

With such an arrangement, a pulse signal can accurately be obtained in response to an input light.

DETAILED DESCRIPTION OF THE PREFERRED EMBODIMENTS

Figure 1A:
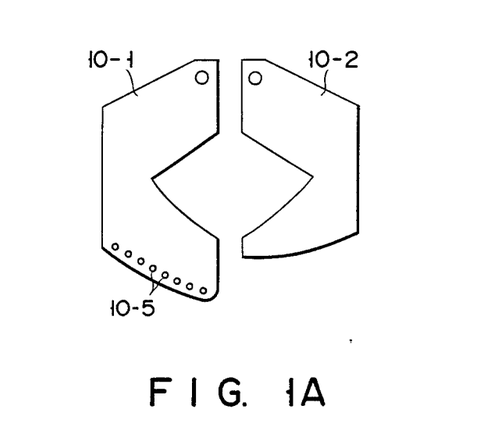
FIGS. 1A and 1B are schematic diagrams of an arrangement of a shutter.
Figure 1B:
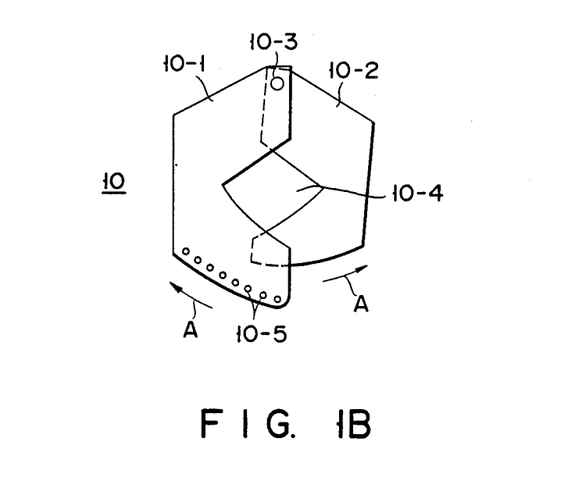

Referring now to FIG. 1A, a shutter of the present invention comprises two vanes 10-1 and 10-2. As illustrated in FIG. 1B, shutter vanes 10-1 and 10-2 are combined to rotate on a pivot 10-3, thus forming the shutter. An aperture 10-4 is formed by overlapping of vanes 10-1 and 10-2 as shown. The size of aperture 10-4 changer as vanes 10-1 and 10-2 rotate. In the tip portion of vane 10-1 are formed detecting openings or holes 10-5, which are adapted to detect the size of the aperture of shutter 10, at a constant pitch in the direction of its rotation.

A shutter drive mechanism normally keeps shutter 10 in the non-opening state, or the closed state. A shutter control section is responsive to the depression of a shutter button to control the shutter control section so as to rotate shutter vanes 10-1 and 10-2 on pivot 10-3 in opposite directions indicated by arrows A as shown in FIG. 1B. As a result, aperture 10-4 of the shutter becomes large. The shutter control section obtains the amount of rotation of vane 10-1 from its home position on the basis of pulses from a pulse generating circuit to be described later and then calculates the size of aperture 10-4. When aperture 10-4 reaches a specified size, the shutter control section controls the drive mechanism to stop the rotation of vanes 10-1 and 10-2 and to subsequently rotate the vanes in directions opposite to the directions indicated by arrows A, thus closing shutter 10. Accordingly it will be understood that shutter 10 shown in FIG. 1B has a combination of functions of shutter and diaphragm.

The pulse generating circuit used for detecting the size of the aperture of the shutter of FIG. 1B will now be described with reference to FIG. 2 and FIGS. 3A to 3D.

Figure 2:
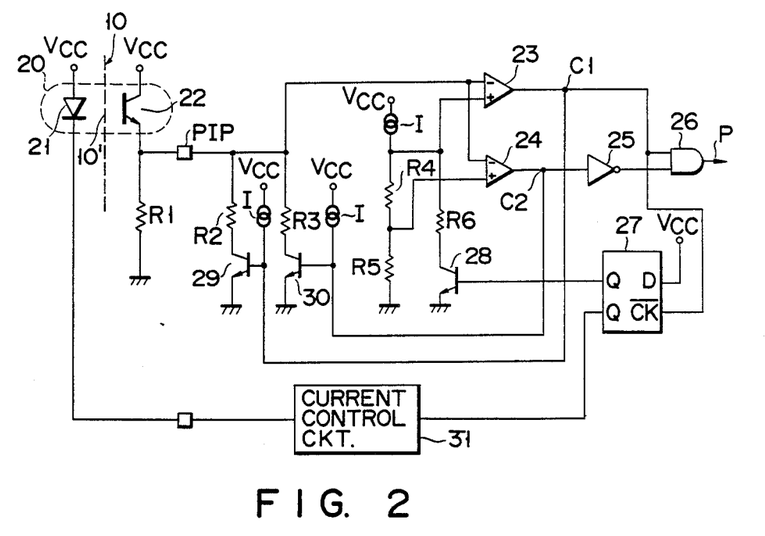
FIG. 2 is a circuit diagram of a pulse generating circuit according to an embodiment of the present invention.

In FIG. 2, a photointerrupter 20 is comprised of a light emitting diode 21 and a photodiode 22. Shutter vane 10-1 is disposed so that its detecting holes 105 will cross the optical path of photointerrupter 20. When shutter vane 10-1 moves, the optical path is interrupted intermittently, thereby controlling incidence and interruption (on and off) of light t photodiode 22. Photodiode 22 is responsive to the on or off of light thereto to control the on or off of current flow therein.

Figure 3A:
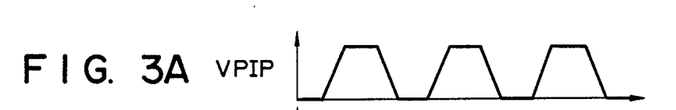
FIGS. 3A, 3B, 3C, and 3D are timing diagrams which are useful in understanding the operation of the pulse generating circuit of FIG. 2.
Figure 3B:
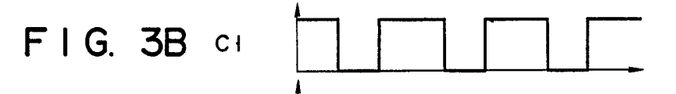
Figure 3C:
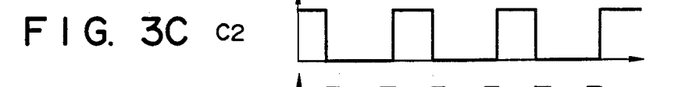
Figure 3D:
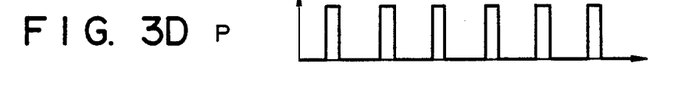

Voltage VPIP at output terminal PIP of photodiode 22 is switched between a high voltage level and a low voltage level, as shown in FIG. 3A, according to the on and off of the current flow. The voltage VPIP is coupled to inverting inputs of first and second voltage comparators 23 and 24. The noninverting input of first voltage comparator 23 is supplied with a reference voltage for comparison from a bias circuit formed of a current source I and resistors R4 and R5. The noninverting input of second voltage comparator 24 is supplied from the bias circuit with a reference voltage for comparison, which is lower than the reference voltage applied to first voltage comparator 23. Thus an output signal C1 (shown in FIG. 3B) of first voltage comparator 23 is larger in pulse width ("1" level interval) than an output signal C2 (shown in FIG. 3C) of second voltage comparator 24. The output voltage C2 is applied to an inverter 25. The output signal of inverter 25 is applied to an AND gate 26 together with the output signal C1 of first voltage comparator 23. AND gate 26 produces a pulse signal which goes to a "1" level during a period in which the voltage VPIP varies as shown in FIG. 3D. The period during which VPIP varies corresponds to the leading-edge or trailing-edge period of a waveform, which depends on the speed of mechanical movement of the shutter vanes.

A D-type flip-flop (DFF) 27 has its clock input CK connected to receive the output signal C1 and its data input D connected to receive VCC supply voltage (a "1" level). When the output signal C1 goes to a "1" level, an output signal on output Q of DFF 27 goes to a "1" level. When the output signal on the output Q goes to the "1" level, an NPN transistor 28 is turned on, thereby causing a resistor R6 to be connected in parallel with the series combination of resistors R4 and R5. As a result, each of the reference voltages of first voltage comparator 23 and second voltage comparator 24 will become about half of its initial value. This value of voltage is a proper reference level in the system configuration for converting the voltage VPIP to pulses.

Connected between output terminal PIP and ground is a series combination of a resistor R2 and an NPN transistor 29. A series combination of a resistor R3 and an NPN transistor 30 is also connected between output terminal PIP and ground. Transistors 29 and 30 have their bases supplied with output signals C1 and C2, respectively. When the voltage VPIP is low, and the output signals C1 and C2 are both at a "1" level, transistors 29 and 30 are conducting. When the voltage VPIP increases, and hence the output signal C2 goes to a "1" level, transistor 30 is turned off and the resistance between output terminal PIP and ground increases, thus increasing the rate of variation of voltage VPIP. When the voltage VPIP increases further and hence the output signal C1 also goes to a "0" level, transistor 29 is also turned off and the resistance between output terminal PIP and ground increases further, thus increasing the rate of variation of voltage VPIP further. The increase of the rate of variation of voltage VPIP means that the thresholds of voltage comparators 23 and 24 become relatively small. In other words, voltage comparators 23 and 24 exhibit a hysteresis property.

A light-emitting-diode current control circuit 31 operates to increase the current flowing through light emitting diode 21 continuously or stepwise until the output signal C1 of first voltage comparator 23 is switched from "1" level to "0" level.

The pulse generating circuit of FIG. 2 relatively accurately provides pulses P corresponding to detecting holes 12 of shutter 10. The output pulses of the pulse generating circuit are applied to a pulse counter (not shown) the output of which is in turn coupled to a shutter control circuit not shown.

The pulse generating circuit of FIG. 2 requires two voltage comparators and thus has a problem of increased circuit scale and hence increased component count Since transistors 29 and 30 connected in parallel to output terminal PIP are turned on or off by variations, in land of corresponding output signals C1 and C2 in level, the level variation of output signal C1 or C2 of voltage comparator 23 or 24 causes a level variation of the input signal applied to the other voltage comparator 24 or 23. Furthermore, noise is superimposed on the voltage VPIP. With the circuit of FIG. 2, therefore, the signals C1 and C2, and the output pulse P of AND gate 26 are subject to variations in their pulse widths. In certain circumstances no pulses might be produced. That is, the circuit of FIG. 2 is liable to become uncertain and unstable in pulse generation.

A second embodiment which is an improvement on the first embodiment will be described with reference to FIG. 4 and FIGS. 5A to 5C.

Figure 4:
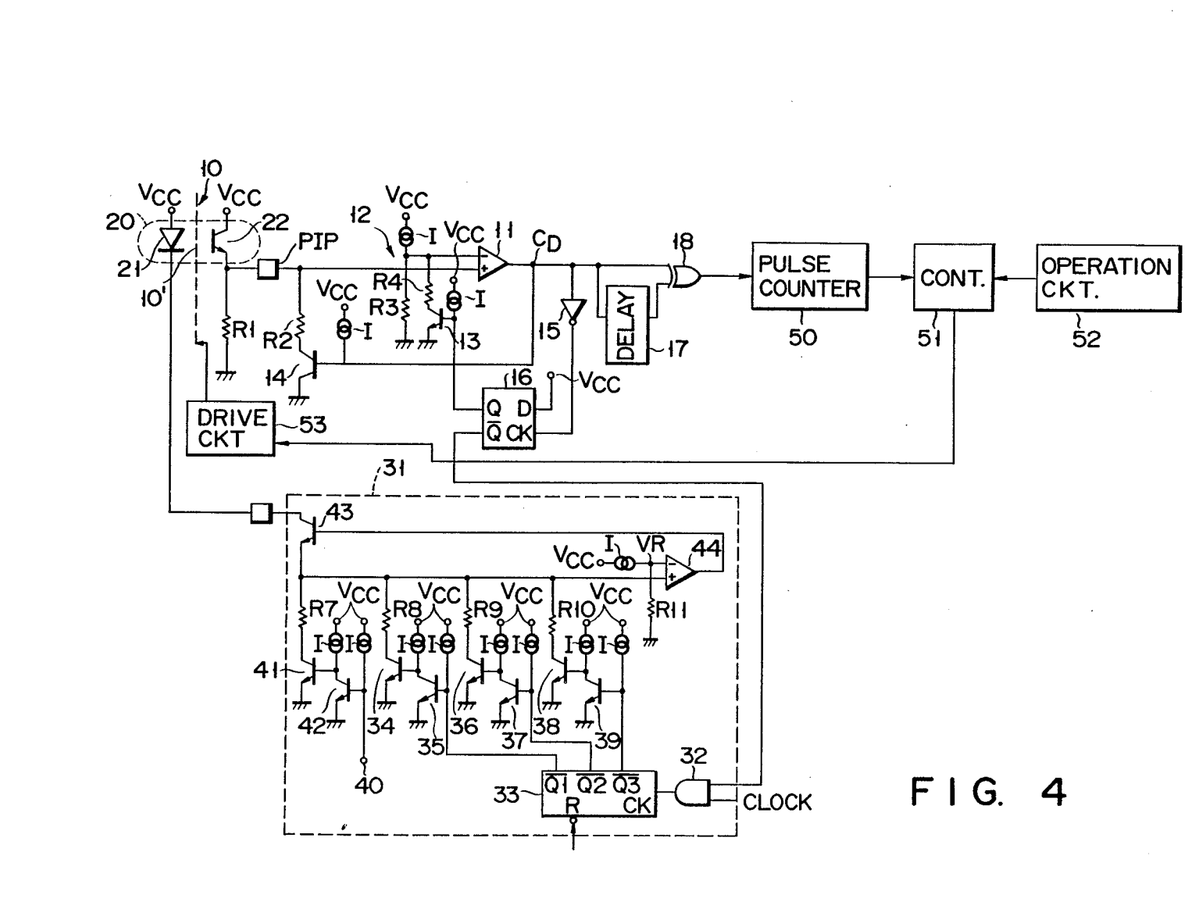
FIG. 4 is a circuit diagram of a pulse generating circuit according to another embodiment of the present invention.

In FIG. 4, photointerrupter 20 is comprised of light-emitting diode 21 and photodiode 22. Shutter 10 is configured as shown in FIGS. 1A and 1B. Shutter blade 10-1 has openings 10-5 (e.g., holes) which are formed at a constant pitch so that they may cross the optical path of photointerrupter 20 in turn with the movement of the blade within the photointerrupter. The optical path is interrupted intermittently with the movement of the shutter blade 10-1. As a result, photo-diode 22 is subjected to the on and off control of its current flow. Resistor R1 is connected between output terminal PIP of photodiode 22 and ground. Voltage VPIP on output terminal PIP is switched between a high voltage level and a low voltage level in accordance with the on and off of the current flow. Voltage VPIP is applied to the inverting input of voltage comparator 11, which is supplied at the noninverting input with a reference voltage from reference voltage generating circuit 12. Reference voltage generating circuit 12 comprises current source I and resistor R3 connected in series between Vcc power supply terminal and ground; resistor R4 having one end connected to the junction of current source I and resistor R3; NPN transistor 13 having its collector connected to the other end of resistor R4 and its emitter connected to ground; and current source I connected between the base of transistor 13 and the VCC power supply terminal. Between output terminal PIP and a terminal supplied with a predetermined potential (ground terminal in the present example) is connected a current path formed of a series combination of a resistive element (e.g., resistor R2) and a switching element (NPN transistor 14). A current source I is connected between the base of transistor 14 and the VCC power supply terminal. The base of transistor 14 is coupled to the output of voltage comparator 11 whose output is coupled to the clock input CK of D-type flip-flop 16 via inverter 15. The data input D of flip-flop 16 is supplied with VCC voltage. The output Q of flip-flop 16 is coupled to the base of transistor 13. The output of voltage comparator 11 is coupled to a delay circuit 17 which introduces a time delay. Outputs of delay circuit 17 and voltage comparator 11 are coupled to an exclusive OR circuit 18.

Output pulses of exclusive OR circuit 18 are applied to a pulse counter 50. The output of pulse counter 50 is coupled to shutter control section 51 whose output is coupled to an arithmatic operation circuit 52.

Light-emitting-diode current control circuit 31 is designed to increase the current flow of light emitting diode 21 until the output C of voltage comparator 11 is switched from a "1" level to a "0" level and arranged as follows.

The output voltage on output Q of flip-flop 16 is applied to an AND circuit 32 along with clock pulses. Output pulses of AND circuit 32 are applied to the clock input CK of a counter 33.

Binary outputs Q1, Q2 and Q3 of counter 33 are respectively coupled to NPN switching transistors 35, 37 and 39 and constant current sources I as shown. Transistors 35, 37 and 39 have their emitters connected to ground and their collectors connected to the emitter of an NPN transistor 43 via resistors R8, R9 and R10, respectively. A control terminal 40 is connected to a constant current source I and an NPN switching transistor 42, which has its emitter connected to ground and its collector connected to an NPN switching transistor 41 and a constant current source I. Transistor 41 has its emitter grounded and its collector connected to the emitter of transistor 43 via a resistor R7.

Current-amplifying transistor 43 has its collector connected to light emitting diode 21 and its emitter connected to the inverting input of an operational amplifier 44. Operational amplifier 44 is supplied at its noninverting input with a reference voltage VR and has its output connected to the base of NPN transistor 43. The reference voltage VR is produced by a constant current source I and a resistor R11.

The operation of the pulse generating circuit of FIG. 4 will now be described with reference to FIGS. 5A to 5D. At first the light emitted from light emitting diode 21 is interrupted by shutter vane 10-1 so that phototransistor 22 is off and the voltage VPIP remains at ground level. The output signal C of voltage comparator 11 is at a "1" level and hence transistor 14 is on so that the resistance between output terminal PIP and ground is small. The output signal of inverter 15 is at "0" level, and outputs Q and Q̄ of flip-flop 16 are at "0" and "1" levels, respectively, so that transistor 13 is off.

Figure 5A:
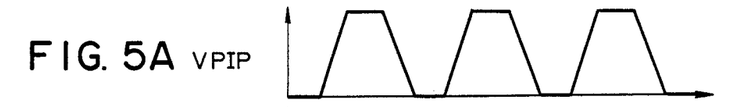
FIGS. 5A, 5B, 5C, and 5D are timing diagrams which are useful in understanding the operation of the circuit of FIG. 4.

In response to depression of a shutter button, shutter control section 51 controls shutter drive mechanism 53 to rotate shutter vanes 10-1 and 10-2 in opposite directions, thus opening shutter 10. When one detecting hole reaches the optical path and hence light starts reaching photodiode 14 with the movement of shutter vane 10-1, the voltage VPIP increases as shown in FIG. 5A. When the voltage VPIP reaches the reference voltage, the output signal C of voltage comparator 11 goes to "0" level, thus turning transistor 14 off. As a result, the resistance between output terminal PIP and ground increases, so that the rate of increase of voltage VPIP increases and hence the threshold voltage of voltage comparator 11 decreases relatively. When the output of voltage comparator 11 goes to "0" level, the output of inverter 15 goes to "1" level and the outputs Q and Q̄ of flip-flop 16 go to "1" level and "0" level, respectively. Consequently transistor 13 is turned on and the reference voltage Output from reference voltage generating circuit 12 becomes about half of the initial voltage. This value of the reference voltage is proper for comparison operation of voltage comparator 11.

Figure 5B:
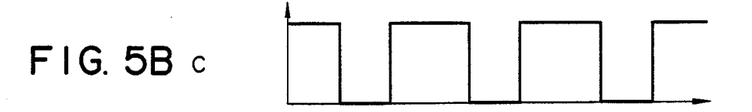
Figure 5C:
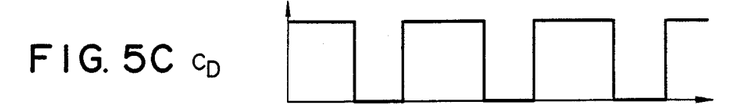
Figure 5D:
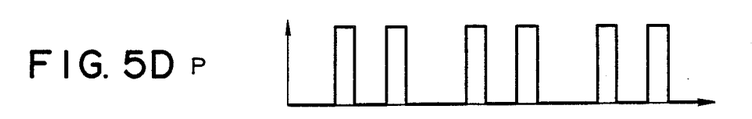

When the light from LED 21 starts to be interrupted by shutter 10, the voltage VPIP starts lowering as shown in FIG. 5B. When the voltage VPIP becomes lower than the threshold voltage of voltage comparator 11, the output signal C of voltage comparator 11 goes to "1" level as shown in FIG. 5B. Consequently transistor 14 is turned on and the threshold voltage of voltage comparator 11 becomes high relatively. The output Q of flip-flop 16 remains at "1" level and transistor 13 remains on.

The output signal C of voltage comparator 11 is delayed a predetermined time by delay circuit 17. Exclusive OR circuit 18 exclusive ORs its input signals to produce corresponding pulses P. That is, when the output signal C is switched from "1" level to "0" level or from "0" level to "1" level, inconsistency occurs with the inputs of exclusive OR circuit 18 for the delay time of delay circuit 17, thereby producing an output pulse. The above operations are repeated with the movement of shutter vane 10-1.

The operation of control circuit 31 will now be described. When power is turned on or the shutter button is half depressed, a reset signal is applied to counter 33. Each of resistors R8, R9 and R10 is electrically connected to or disconnected from ground in accordance with the count of counter 33, thus varying the resistance value between the emitter of transistor 43 and ground. Operational amplifier 44 operates to make the emitter voltage of transistor 43 equal to the voltage VR at its noninverting input. Current flowing through transistor 43 (i.e., current flowing through light emitting diode 21) is controlled by the output of amplifier 44. The greater the number of resistors, such as R8, R9 and R10, to be connected in parallel, the smaller the resistance between the emitter of transistor 43 and ground. This will permit the current flowing through light emitting diode 21 to increase and hence the output level of photodiode 22 to increase. At the beginning of operation of control 31, therefore, when a control input signal with a predetermined potential is applied to control input terminal 40 so as to turn transistors 41 and 42 and hence transistor 43 on, a predetermined current flows through light emitting diode 21. The output signal C of voltage comparator 11 and the output Q of flip-flop 16 both remains at "1" level until the voltage VPIP becomes higher than the comparison reference voltage, during which time clock pulses are counted by counter 33 through AND gate 32. While the clock pulses are counted, the outputs Q1, Q2 and Q3 of counter 33 sequentially go to "1" level, causing resistors R8, R9 and R10 to be connected in parallel with resistor R7 in sequence. As a result of this, the current flowing through light emitting diode 21 gradually increases. The voltage VPIP increases with increasing current of light emitting diode 21 to switch the output signal C of voltage comparator 11 from "1" level to "0" level. The output Q̄ of flip-flop 16 is thus switched from "1" level to "0" level with the result that AND gate 32 is disabled and the count operation of counter 33 is terminated.

Output pulses of exclusive OR circuit 18 are counted by counter 50. Arithmetic operation circuit 52 detects the ASA value of a film used to obtain the optimum aperture stop value by an arithmetic operation or detects a manually set stop value. Shutter control section 51 is responsive to depression of the shutter button to control shutter drive mechanism 53 so as to open shutter 10. Shutter control section 51, on the other hand, checks the count of counter 50 and controls drive mechanism 53 to close shutter 10 when opening 10-4 reaches a fixed value in size specified by arithmetic operation circuit 52.

According to the present embodiment, as described above, only one voltage comparator suffices and thus the count of circuit components used can be small because the pulses are generated by processing the output of the photointerrupter which detects the movement of the shutter vanes. Moreover, since the pulses are produced by logically processing varying portions of waveshaped output signals of the voltage comparator, the pulse generation can be performed surely and stably.

Figure 6:
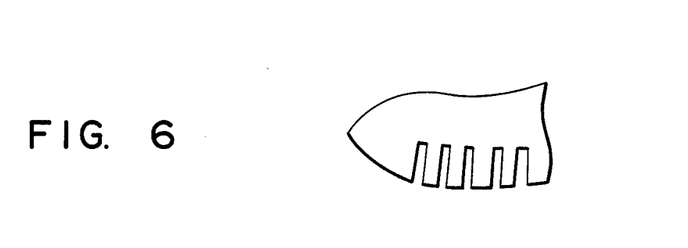
FIG. 6 illustrates another arrangement of the shutter.

The present invention need not be limited to the above specific embodiments. For instance, although holes 10-5 are used as means for detecting the size of opening 10-4 of shutter 10 in FIGS. 1A and 1B, any form might be adopted if it could interrupt light. As an example, notches may be formed in shutter vane 10-1 as shown in FIG. 6. Furthermore, although, in FIGS. 1A and 1B, the holes are provided in one of the two vanes, they may be provided in the two vanes. In this case, the size of the opening may be detected by detecting the amount of movement of each vane. In addition, more than two vanes may be combined to form a shutter. The above pulse generating circuit is arranged such that the voltage VPIP increases when photodiode 22 receives light. Alternatively, the circuit may be arranged such that the voltage VPIP decreases when photodiode 22 receives light.

What is claimed is:

1. A pulse generating circuit comprising:
   a shutter formed of a plurality of shutter vanes which are movable to form an aperture, the aperture varying in size with the movement of said shutter vanes and at least one of said shutter vanes having a plurality of openings for detecting the movement of said shutter vanes;
   a photointerrupter responsive to the movement of said detecting openings of said shutter vanes to be turned on or off, said photointerrupter providing an output voltage at its output terminal;
   a voltage comparator for comparing the output voltage of said photointerrupter with a reference voltage;
   reference voltage generating means for generating the reference voltage;
   switch means for turning on or off in response to an output signal of said voltage comparator;
   a resistor connected in series with said switch means, the series combination of said switch means and said resistor being connected between said the output terminal of said photointerrupter and a terminal of a predetermined potential;
   delay circuit means for delaying the output signal of said voltage comparator a predetermined time;
   exclusive OR circuit means for exclusive ORing an output signal of said delay circuit means and the output signal of said voltage comparator to produce a train of pulses in response to the movement of said openings;
   counter means for counting the pulses output from said exclusive OR circuit means; and
   control and drive means responsive to said counter means for controlling the operation of said shutter.

2. A pulse generating circuit according to claim 1, wherein said reference voltage generating circuit means responsive to said voltage comparator for shifting the reference voltage.

3. A pulse generating circuit according to claim 1, wherein said reference voltage generating circuit means comprises a current source; a first resistor connected between said current source and the predetermined potential; second switch means responsive to variations in voltage level of the output signal of said voltage comparator to be turned on or off; a second resistor connected between said second switch means and said current source; and means for supplying a voltage at the junction of said current source and first and second resistors to said voltage comparator as the reference voltage.

4. A pulse generating circuit according to claim 1, wherein said photointerrupter comprises an element responsive to current flow therein for emitting light, and an element for receiving the light emitted by said light emitting element; and wherein said pulse generating circuit further comprises light-emitting-element control means for increasing a current applied to said light emitting element with time.

5. A pulse generating circuit for generating pulses by use of a single comparator comprising:
   light receiving means responsive to received light for producing an output signal;
   comparator means for comparing the output signal of said light receiving means with a reference signal;
   means for providing a substantial hysteresis property to said comparator means;
   delay circuit means for delaying an output signal of said comparator means a predetermined time; and
   exclusive OR circuit means for exclusive ORing an output signal of said delay circuit means and the output signal of said comparator means to provide a pulse signal corresponding to the exclusive OR of the output signals.

6. A pulse generating circuit according to claim 5, wherein said means for providing a substantial hysteresis property to said comparator means comprises switch means responsive to the output signal of said comparator means to be switched; and
   a resistor connected in series with said switch means, the series combination of said switch means and said resistor being connected between an output terminal of said light receiving means and a terminal of a predetermined potential.

7. A pulse generating circuit according to claim 5, wherein said reference signal generating means includes means responsive to said comparator means for decreasing the level of the reference signal when the output signal of said light receiving means becomes larger than the reference signal.

8. A pulse generating circuit according to claim 6, wherein said reference signal generating means comprises a current source; a first resistor connected between said current source and a predetermined potential; second switch means responsive to variations in level of the output signal of said comparator means to be turned on or off; a second resistor connected between said second switch means and said current source; and means for supplying a signal at the junction of said current source and first and second resistors to said comparator means as the reference signal.

9. A pulse generating circuit according to claim 6, further comprising a shutter formed of a plurality of shutter vanes which are movable to form an aperture, the aperture varying in size with the movement of said shutter vanes and at least one of said shutter vanes having a plurality of openings for detecting the movement of said shutter vanes, said openings turning on and off said light receiving means with the movement of said shutter vanes; counter means for counting pulses output from said exclusive OR circuit means; and control and drive means responsive to said counter means for controlling the operation of said shutter.

* * * * *

UNITED STATES PATENT AND TRADEMARK OFFICE
CERTIFICATE OF CORRECTION

PATENT NO. : 4,972,078
DATED : November 20, 1990
INVENTOR(S) : Shinichi Hasebe et al.

It is certified that error appears in the above-identified patent and that said Letters Patent is hereby corrected as shown below:

Column 1, Line 14, delete "hitherto".

Column 2, Line 31, change "changer" to --changes--.

Column 4, Line 10, after "count" insert --.--.

Column 4, Line 12, change "land" to --level--".

Claim 1, Column 7, Line 53, delete "the".

Claim 2, Column 7, Line 68, delete "circuit".

Claim 2, Column 7, Line 68, after "means" insert --comprises means--.

UNITED STATES PATENT AND TRADEMARK OFFICE
CERTIFICATE OF CORRECTION

PATENT NO. : 4,972,078

DATED : November 20, 1990

INVENTOR(S) : Shinichi Hasebe et al.

It is certified that error appears in the above-identified patent and that said Letters Patent is hereby corrected as shown below:

Claim 3, Column 8, Line 4, delete "circuit".

Signed and Sealed this

Twenty-fourth Day of November, 1992

Attest:

DOUGLAS B. COMER

*Attesting Officer*     Acting Commissioner of Patents and Trademarks